United States Patent [19]

Clark et al.

[11] 4,054,444
[45] Oct. 18, 1977

[54] METHOD FOR CONTROLLING THE CARBON CONTENT OF DIRECTLY REDUCED IRON

[75] Inventors: Donald W. Clark, North Litchfield Beach; Allan C. Huestis, Georgetown, both of S.C.

[73] Assignee: Midrex Corporation, Charlotte, N.C.

[21] Appl. No.: 615,459

[22] Filed: Sept. 22, 1975

[51] Int. Cl.² ............................................. C21B 13/02
[52] U.S. Cl. ............................................. 75/35; 75/34
[58] Field of Search ........................... 75/34, 35, 26, 91

[56] References Cited
U.S. PATENT DOCUMENTS

| | | | |
|---|---|---|---|
| 2,653,088 | 9/1953 | Pike | 75/35 X |
| 3,375,098 | 3/1968 | Marshall | 75/34 X |
| 3,901,490 | 8/1975 | Kanbara et al. | 75/34 UX |

*Primary Examiner*—M. J. Andrews
*Attorney, Agent, or Firm*—Ralph H. Dougherty

[57] ABSTRACT

This invention relates to a method for controlling the carbon content of metallized iron pellets produced by the continuous direct reduction of iron oxide in a vertical shaft furnace with a reducing gas having a high hydrogen and carbon monoxide content. According to the method, in addition to the standard reducing gases introduced to the reducing zone, methane or methane-containing gas is introduced to the shaft furnace at specified locations beneath the reducing zone and, by controlling the conditions in the furnace, a proportion of the injected gas is reformed in the furnace to reducing gases.

12 Claims, 1 Drawing Figure

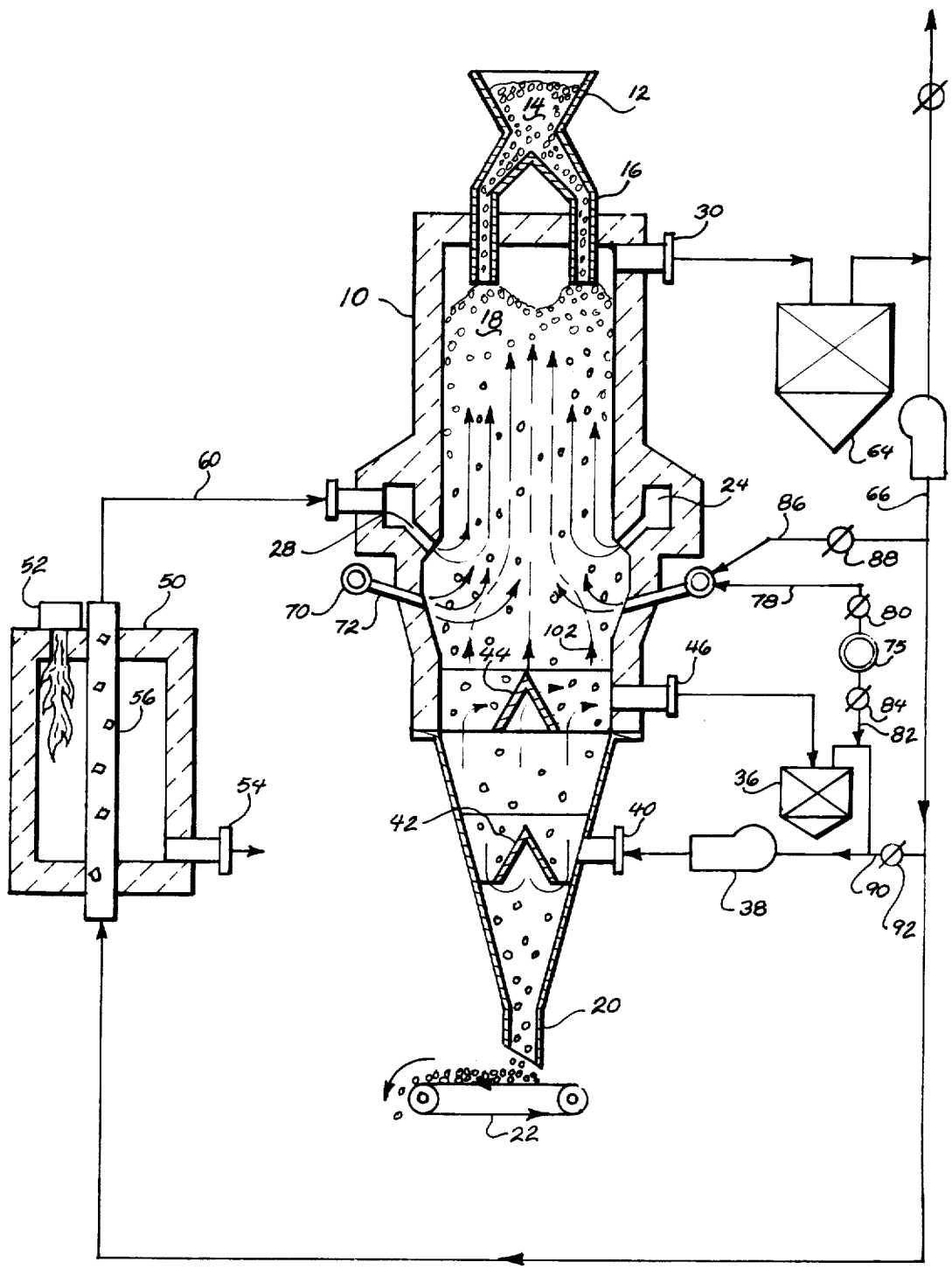

METHOD FOR CONTROLLING THE CARBON CONTENT OF DIRECTLY REDUCED IRON

BACKGROUND OF THE INVENTION

This invention relates generally to the direct reduction of iron oxide materials to produce metallic iron in a solid state, such as sponge iron or metallized pellets. "Metallized", as used throughout this specification does not means coated with metal, but means nearly completely reduced to the metallic state, i.e., always in excess of 75% metal, and usually in excess of 85% metal in the product. Such metallized pellets are well suited as feed material to steelmaking furnaces such as an electric arc furnace. It is desirable to control the carbon content of such pellets to any specified level between 0 and 4%. For electric furnace operation, this level usually varies between 0.8 and 2%.

In the operation of a shaft furnace, raising the operation temperature in the furnace above the normal operating temperature of about 1400° F causes an increase in production, but a concomitant loss of carbon in the product. Thus it is also desirable to control the carbon content of the metallized iron pellet product within certain limits while increasing the operating temperature of the furnace while increasing the production rate.

I have found that by injecting methane or methane-containing gas at certain specified locations in a direct reduction shaft furnace, I can increase the operating temperature of the furnace as much as 300° F, and increase the production capacity while controlling the carbon content of the product between 0 and 4%.

OBJECTS OF THE INVENTION

It is the principal object of the subject invention to provide a method of operating a shaft furnace for the direct reduction of iron oxide to iron which provides a controlled carbon content of the product.

It is another object of the invention to provide an improved process for converting iron oxide pellets to metallized pellets in a shaft furnace having increased thermal efficiency over that heretofore attained in the art.

It is yet another object of this invention to provide a method for economically converting iron oxide material to the metallic state.

It is another object of this invention to provide a method for increasing the production capacity of a continuous direct reduction shaft furnace.

BRIEF DESCRIPTION OF THE DRAWING

These and other objects and features of the invention will be better understood by referring to the following detailed specification and the appended drawing in which:

The single FIGURE is a schematic drawing of a vertical shaft furnace suitable for carrying out the method of the subject invention.

DETAILED DESCRIPTION

The process employs a vertical shaft-type reducing furnace 10 having a reducing zone in the upper region of the furnace and a cooling zone in the lower region of the furnace. The region within the furnace between the cooling zone and the reducing zone shall be termed the "buffer zone". A feed hopper 12 is mounted atop furnace 10. Iron oxide pellets 14 or other materials such as lump ore are charged into the feed hopper and descend by gravity through a plurity of feed pipes 16 to form a bed 18 of particulate iron oxide-containing material, or burden, in the shaft furnace. A pellet discharge pipe 20 is located at the bottom of shaft furnace 10. Reduced, or metallized, material is removed from the furnace by discharge conveyor 22 located beneath discharge pipe 20. Removal of the metallized pellets from discharge pipe 20 establishes gravitational flow of the particulate iron oxide burden 18 through shaft furnace 10.

Surrounding the shaft furnace is a bustle and tuyere system, indicated generally at 24, having gas ports 28 through which hot reducing gas is introduced to the reducing zone to flow inwardly and upwardly in counterflow relationship to the movement of burden 18. The spent top-gas exits the furnace through gas takeoff pipe 30 at the top of the furnace.

A cooling gas loop recirculating system is provided at the cooling zone of the furnace to cool the pellets prior to their discharge. This cooling system includes a scrubber cooler 36, a recirculating gas blower 38, gas inlet 40, gas distributing member 42 located within the furnace, gas collecting member 44 positioned above the gas distributing member within the furnace, gas outlet 46, and the associated piping external to the furnace.

A reformer furnace 50 having fuel fired burners 52, a flue pipe 54, and a plurality of indirect heat exchanger catalyst tubes 56, which are externally heated, only one being shown, generates hot reducing gas. The reducing gas flows from the catalyst tubes 56 through the bustle and tuyere system 24 through gas pipe 60.

The spent top-gas leaving shaft furnace 10 through the takeoff pipe 30 flows to a cooler scrubber 64 wherein the gas is cooled and dust particles are removed. Pipe 66 leads from scrubber 64 to the inlet of catalyst tube 56 in reformer furnace 50.

A second bustle and tuyere system is provided around furnace 10 and is indicated generally at 70. Gas inlet pipes 72 are directed downwardly into the buffer zone of the furnace. A source of methane gas 75 communicates with the bustle system 70 through pipe 78 having control valve 80 therein. Methane source 75 also communicates with the cooling system through pipe 82 having control valve 84 therein. Pipe 82 can be connected to the cooling system at any desired location including directly into the cooling zone in the furnace. Additionally, top-gas from pipe 66 can be injected in bustle 70 through pipe 86 having a control valve 88 therein. Also top-gas can be introduced to the cooling system through pipe 90 having control valve 92 therein.

When methane is subjected to thermal cracking it forms elemental carbon (soot) and free hydrogen. Cleaned and cooled spent top-gas contains as much as 16% $H_2O$, as well as methane, carbon dioxide and other gases. When methane cracks in the presence of $H_2O$, some CO is formed in addition to carbon and hydrogen. Some methane will also react with the metallized iron present in the furnace raising the carbon content of the metallized product. The thermal cracking of $CH_4$, which occurs between about 900° and 1100° F, is an endothermic reaction, that is it requires heat. The reduction reaction of hydrogen with iron oxide is also endothermic. The reaction of carbon monoxide with iron oxide, however, is exothermic. Thus it is desirable to reduce the hydrogen to carbon monoxide ratio of the gases supplied to the furnace, to prevent the chemical reactions occurring therein from cooling the burden in the reaction zone to a temperature too low for efficient reduction of the burden to sponge iron. Operating the furnace at too high a temperature will cause fusing or clustering of the particles in the burden.

Raising the operating temperature in the reducing zone causes a loss of carbon in the product, but does increase the rate of production. It has now been determined that a significant amount of reforming of reducing gas can be accomplished in the shaft furnace, even in the regions beneath the hot reducing zone.

By introducing methane, methane-containing gas, or a combination thereof to certain selected furnace locations beneath the reducing zone, reforming (formation of hydrogen and carbon monoxide) of reducing gases will occur in the furnace, allowing the operator to maintain a higher furnace temperature in the reducing zone without a concomitant loss of carbon in the product. By properly controlling valves 80, 84, 88 and 92, methane or top-gas or a combination can be introduced to bustle 70 or the cooling zone or both. The following have proved to be suitable practices for accomplishing the objectives of this invention.

1. Open valve 84 only, thus injecting methane into the cooling zone.
2. Open valve 80 only thus injecting methane to the buffer zone through bustle 70.
3. Open both valves 80 and 88 thus injecting a mixture of methane and cooled spent top gas to the buffer zone through bustle 70.
4. Open valves 80, 84 and 88 thus injecting methane and top-gas to the buffer zone through bustle 70 and methane to the cooling zone. The methane in the cooling zone will thermally crack and expand causing additional upflow of the cooling gas into the buffer zone.
5. Open only valve 88 thus introducing cooled spent top-gas to the buffer zone through bustle 70.
6. Open valves 88 and 84 thus introducing cooled spent top-gas to the buffer zone and methane to the cooling zone.
7. Propane or butane can be utilized in any of the above procedures in place of methane, thus source 75 could be a source of some hydrocarbon other than methane.

By monitoring the carbon content of the product removed from discharge pipe 20 it is possible to determine whether additional methane or top-gas should be injected into the furnace.

1. A method for controlling the carbon content of metallized iron pellets by counter-current flow of hot reducing gases through a downwardly moving iron oxide burden in a substantially vertical shaft furnace, said furnace having an upper reducing zone, a lower cooling zone and an intermediate buffer zone between the reducing and cooling zones, said method comprising:
   introducing particulate iron oxide to the interior of said furnace to establish a burden therein;
   removing a portion of said burden from the bottom of said cooling zone to establish a gravitational descent of said burden;
   introducing hot reducing gases to said furnace in said reducing zone to react with said descending burden and form a reacted top gas;
   introducing cooled cooling gas to the cooling zone of said furnace and removing heated cooling gas from the top of the cooling zone of said furnace;
   monitoring the carbon content of the metallized iron pellet product upon its discharge from said furnace;
   introducing a hydrocarbon gas selected from the group comprising methane, butane, propane, methane containing gas, and mixtures thereof to said shaft furnace in said buffer zone; and
   varying the rate of introduction of said hydrocarbon gas in response to the change in carbon content of the product, whereby the carbon content of said metallized iron pellet product is controlled by varying the hydrocarbon gas input conditions to the furnace.

2. A method according to claim 1 further comprising injecting a hydrocarbon gas into said cooling zone.

3. A method according to claim 1 further comprising injecting propane into the cooling zone.

4. A method according to claim 1 further comprising injecting butane into the cooling zone.

5. A method according to claim 1 wherein cooled spent methane-containing top-gas is injected to the buffer zone and methane is injected to the cooling zone.

6. A method according to claim 1 wherein methane is injected into said buffer zone.

7. A method according to claim 1 wherein a mixture of methane and methane-containing gas is injected into said buffer zone.

8. A method according to claim 7 wherein said methane-containing gas is obtained by cooling and cleaning spent top-gas from said shaft furnace.

9. A method according to claim 1 wherein methane and methane-containing top-gas are introduced to said buffer zone while methane is introduced into said cooling zone.

10. A method according to claim 1 wherein cooled spent methane-containing top-gas is injected into said buffer zone.

11. A method of producing a methallized iron product in a generally vertical shaft furnace having an upper reducing zone in which iron oxide reacts with a gaseous reductant, a lower cooling zone through which a cooling gas circulates to reduce the temperature of the product, and an intermediate buffer zone between said reducing and cooling zones, said method comprising:
   introducing particulate iron oxide to the interior of said furnace to establish a burden therein;
   removing a portion of said burden from said cooling zone to establish a gravitational descent of said burden;
   introducing a hot gaseous reductant to said descending burden in said reducing zone to react with said burden to form a metallized iron product and a reacted gas;
   removing said reacted top gas from the top of said furnace to establish countercurrent flow of said reducing gas through said descending burden;
   injecting a cooling gas into the cooling zone of said furnace to cool the product prior to its discharge and form a heated cooling gas;
   removing at least part of said heated cooling gas from said furnace; injecting a treating gas into said buffer zone; and
   causing said treating gas to flow inwardly and upwardly through said descending burden in counterflow heat exchange relationship therewith, whereby said treating gas is at least partially reformed into reducing gases and the descending burden is at least partially cooled thereby.

12. A method according to claim 11 wherein said treating gas is selected from the group comprising methane, propane, butane, methane-containing gas and mixtures thereof.

* * * * *